United States Patent [19]

Akashi et al.

[11] 4,117,190

[45] Sep. 26, 1978

[54] MAGNETIC RECORDING MEDIUM

[75] Inventors: Goro Akashi; Osamu Suzuki; Masaaki Fujiyama, all of Odawara, Japan

[73] Assignee: Fuji Photo Film Co., Ltd., Minami Ashigara, Japan

[21] Appl. No.: 516,315

[22] Filed: Oct. 21, 1974

Related U.S. Application Data

[63] Continuation-in-part of Ser. No. 370,260, Jun. 15, 1973, abandoned, which is a continuation of Ser. No. 164,042, Jul. 19, 1971, abandoned, which is a continuation of Ser. No. 766,640, Oct. 10, 1968, abandoned.

[30] Foreign Application Priority Data

Oct. 11, 1967 [JP] Japan ............................. 42-65268

[51] Int. Cl.² ............................................. H01f 10/06
[52] U.S. Cl. .................................. 428/325; 428/323; 428/328; 428/329; 428/331; 428/900
[58] Field of Search .......................... 117/235–240; 428/331, 328, 329, 900, 323, 325; 427/127–132

[56] References Cited

U.S. PATENT DOCUMENTS

| | | | |
|---|---|---|---|
| 2,804,401 | 8/1957 | Cousino | 117/235 |
| 3,293,066 | 12/1966 | Haines | 427/127 UX |
| 3,423,233 | 1/1969 | Akashi et al. | 117/235 |
| 3,617,378 | 11/1971 | Beck | 117/235 |
| 3,622,386 | 11/1971 | Larsen | 117/235 |
| 3,630,910 | 12/1971 | Akashi et al. | 117/235 |
| 3,687,725 | 8/1972 | Hartmann et al. | 117/235 |
| 3,833,412 | 9/1974 | Akashi | 117/235 |
| 3,843,404 | 10/1974 | Haefele et al. | 117/235 |

OTHER PUBLICATIONS

Friedman et al., IBM Tech. Dis. Bull., p. 779, vol. 9, No. 7, Dec. 1966.

Primary Examiner—Bernard D. Pianalto
Attorney, Agent, or Firm—Sughrue, Rothwell, Mion, Zinn and Macpeak

[57] ABSTRACT

By incorporating 5 to 15 parts by weight of a finely divided powder having high hardness and a particle size of less than $10\mu$ with 100 parts by weight of graphite powder with 20 to 50 parts by weight of a binder in a graphite layer of a magnetic recording medium which comprises a support, a magnetizable layer and a graphite layer provided on the opposite side of the support from the magnetizable layer, a reduction in the abrasion and the destruction of the graphite layer during running can be reduced.

21 Claims, No Drawings

MAGNETIC RECORDING MEDIUM

CROSS-REFERENCE TO RELATED APPLICATIONS

This application is a continuation-in-part application of copending application Ser. No. 370,260, filed June 15, 1973, now abandoned, which is in turn a continuation of application Ser. No. 164,042, filed July 19, 1971, now abandoned, which is in turn a continuation of application Ser. No. 766,640, filed Oct. 10, 1968, now abandoned.

BACKGROUND OF THE INVENTION

1. Field of the Invention:

This invention relates to a magnetic recording medium.

2. Description of the Prior Art

In general, a magnetic recording medium is composed of a support having an undercoat and a magnetic recording layer thereon. In certain cases, a graphite-containing layer is formed on the opposite surface of the support to the magnetic recording layer to provide an endless magnetic recording tape. As materials for such magnetic recording media, there are usually employed triacetyl cellulose, diacetyl cellulose, polyethylene terephthalate, and polyvinyl chloride. A standard composition for the magnetic recording layer comprises about 30 to 40% by volume magnetic powders, about 60 to about 70% by volume of a binder, such as polyvinyl acetate, a copolymer of vinyl chloride and vinyl acetate, or an epoxy resin, and suitable additives.

Heretofore, common endless belt magnetic recording tapes, as mentioned above, comprised a magnetic recording layer provided on one side of a film support, and a graphite layer on the opposite side of the support to the magnetic recording layer. The graphite layer was usually formed by applying a graphite powder having a particle size of less that $10\mu$ dispersed in a binder. The anti-abrasion properties of these endless tapes depend substantially on the properties of the graphite layer.

Many methods have been suggested to improve the durability of the graphite layer on these endless tapes. A number involve forming projecting patterns on the graphite layer. Endless tapes having an uneven graphite layer provided with dots or a pattern of oblique lines have a fairly long life.

However, since the applications for such endless tapes have expanded, the tapes thus formed were not satisfactory in all instances. Specifically, when the uses of these spread from sound recording to image recording, the anti-abrasion qualities of these graphite layers were insufficient as the running velocity of the tape increased, thus during usage of the tape, localized reduction of the signal (drop cut) tends to develop due to wearing away of the graphite layer. Therefore, it is necessary to improve the durability of the graphite layer.

SUMMARY OF THE INVENTION

As a result of research in order to overcome the problems encountered in the prior art, the inventors have discovered that if a powder of a hard material is added as a fifth component to a composition comprising graphite powder, a binder, a plasticizer and an organic solvent used to produce the graphite layer, the anti-abrasion property of endless tape will be greatly improved.

Basically, according to the present invention a magnetic recording medium is provided which comprises a support, a magnetizable layer on one side of the support and a graphite layer, the graphite layer on the other side of the support containing 5 to 15 parts by weight of a finely divided powder having a particle size of less than $10\mu$ and a hardness of greater than 2 on the Moh's hardness scale and 20 to 50 parts by weight of a binder per 100 parts by weight of graphite powder. Many materials are described in the specification which can be utilized as the finely divided hard powder, the preferred materials being iron oxide, aluminum oxide, chromium oxide, silicon carbide, silicon dioxide, zinc dioxide, garnet and tungsten oxide. The basic magnetic recording medium of this invention thus comprises a support a magnetizable layer and a graphite layer containing the powder described above, a binder and graphite in the proportions recited.

DESCRIPTION OF THE PREFFERRED EMBODIMENTS

As is clear from the above description, an object of this invention is to provide a magnetic recording medium having excellent anti-abrasion properties which is preferably employed as an endless magnetic recording tape (designated "endless tape" hereinafter, for brevity).

According to the present invention, there is provided a magnetic recording medium comprising a support and, on opposite sides thereof, a magnetizable layer and a graphite layer wherein the graphite layer contains 5 to 15 parts by weight of a finely divided powder having a particle size of less than $10\mu$ and a hardness of greater than 2 on the MoH's hardness scale and 20 to 50 parts by weight of a binder per 100 parts by weight of graphite powder.

As a material having a hardness of more than 2 on the Moh's hardness scale, inorganic compounds such as iron oxides, chromium oxides, silicon oxide, zinc oxide, titanium boride, boron nitride, titanium nitride, zirconium nitride, artificial diamond, silicon carbide, boron carbide, titanium carbide, zirconium carbide, tungsten carbide, chromium carbide, molybdenum carbide and also such minerals as sylvite, muscovite, cinnabar, pyrolusite, polybasite, brucite, borax, carnallite, cryolite, phlogopite, bournonite, crocoite, calcite, enargite, olivenite, anhydrite, celestite, millerite, chalcopyrite, zincblende, barite, dolomite, heulandite, magnesite, fluorite, pyrrhotite, zincite, smithonite, colemanite, phlilipsite, wollastonite, scheelite, hemimorphite, apophyllite, thorite, apatite, wolframite, limonite, niccolite, arsenopyrite, willemite, chromite, cobaltite, uraninite, psilomelane, smaltite, anatase, sodalite, orthoclase, magnetite, plagioclase, rutile, pyrite, spodumene, cassiterite, diaspore, olivine, sillimanite quartz, garnet, agate, beryl, tourmaline, staurolite, andalusite, zircon, spinel, topaz, phenacite, chrysoberyl corundum, carborundum, and diamond can be employed. However, in view of the thickness of the graphite layer, the particle size of the powder is less than $10\mu$ after being dispersed by a ball mill, and is preferably less than $5\mu$.

The invention will now be more fully explained by reference to the following comparative example and examples which specifically demonstrate the advantages of the present invention.

COMPARATIVE EXAMPLE 1

A standard magnetic recording layer was applied to a surface of a polyester film support (25μ thick) such that the thickness of the magnetic recording layer after drying was 10μ, and a graphite layer was applied to the opposite surface thereof so as to form gravure pattern of a size of 150 mesh having a dried thickness of 2μ.

The composition employed in the graphite layer was prepared by adding 3000 parts of a graphite powder having an average particle size of 10μ as a lubricant, 600 parts of vinyl chloride-vinyl acetate copolymer as a dispersing agent for the graphite powder and as a tackifier, and 150 parts of plasticizer TCP (tricresyl phosphate) as a softening agent, to a suitable amount of amyl acetate as an organic dispersing solvent and the materials were dissolved and dispersed by using a ball mill.

This coated material was slit to a 6.35 mm. width to obtain an endless tape.

EXAMPLE 1

A standard magnetic recording layer was applied to a surface of the same polyester film support described in Comparative Example 1 (25μ thick) so that its thickness after the magnetic recording layer was dried was 10μ. A graphite layer was then applied to the opposite surface thereof so as to form a gravure pattern of a size of 150 mesh having a 2μ thickness. In this case, the graphite composition employed was prepared by adding 300 parts of a powder to improve the anti-abrasion property of the layer as the fifth component to the composition of Comparative Example 1. This was then dispersed in a ball mill. This "fifth component" was iron powder ($\alpha$-$Fe_2O_3$) (Moh's scale hardness: 5.5–6.5); aluminum oxide (Moh's scale hardness: 9); chromium oxide, (Moh's scale hardness: 5); silicon carbide (Moh's scale hardness: 9–10); silicon oxide (Moh's scale hardness: 7); and zinc oxide (Moh's scale hardness: 4–4.5); having an average particle size of less than 10μ. The thus coated material was slit to a 6.35 mm. width to obtain 6 endless tapes.

EXAMPLE 2

Several endless tapes comprising a magnetic layer on a polyester film support and a graphite layer on the opposite surface thereof were produced by adding 50 to 1000 parts of chrome oxide as the fifth "abrasion resistance improving" component to the graphite layer composition as described in Comparative Example 1.

EXAMPLE 3

Four (4) types of endless tapes were produced (by the same procedure as in Example 1) but to each composition of Comparative Example 1, 400 parts of carbon black, magnetic iron oxide, garnet powder (Moh's scale hardness: 7) or tungsten having an average particle size less than 10μ as the 5th component was added.

An anti-abrasion test was carried out by rolling the resultant tape in a casset to form a 370 m. endless tape, and by setting the tape on a recorder having a 76.2 cm/sec sending out speed specially manufactured. The endless layer was evaluated to determine the amount of wear and the wow or flutter at a point beyond 5%.

As a result of this test, it was found that the wearing amount of the graphite layer of the endless tape produced in Comparative Example 1 was large at 30 minutes after the beginning of the running, and that it took 2 hours and 45 minutes after the beginning of the running to reach 5% of the wow or flutter.

Comparing the results, it can be stated that the wearing amount of the graphite layer produced as in Example 1 (by adding an anti-abrasion agent) was remarkably lower, for example, less than 1/20 for chrome oxide and iron oxide ($\alpha$-$Fe_2O_3$), 1/10 for aluminum oxide, and ¼ for silicon carbide and zinc oxide, based on the Comparative example. Further, the period of time to reach a 5% wow or flutter level was 185 hours in the case of chrome oxide, 170 hours for iron oxide ($\alpha$-$Fe_2O_3$) and 16 to 140 hours for the other materials.

The durability of the endless tape produced in Example 2 was as follows: with the tape to which was added 50 parts of chrome oxide, 2.1 times the period of time to reach 5% wow or flutter, and 1/1.5 times the wearing amount of the graphite layer were noted (based on the results obtained with the Comparative Example).

As shown above, the anti-abrasion property of the endless tape exhibited an inverse relationship to the wearing amount of the graphite layer. Therefore, it was possible to determine the durability of the tapes by evaluating either of them. The durability of the tapes produced as in Example 2 increased as the amount of chrome oxide increased, and the deterioration of the tape when chrome oxide was added in an amount of 1000 parts was not observed after running the durability test for 200 hours. The test was then stopped because the continuation thereof was unnecessary.

Further, the durability of the tape produced as in Example 3 was improved as compared with the Comparative Example, that is, an improvement of about a 10.5 times was observed for the garnet powder, and an improvement of about 13 times was observed for the tungsten carbide.

As described above, in spite of it being believed that the coefficient of friction is not lowered by adding the materials, the durability of the graphite layer is improved by the materials. A possible theory for the improvement may be as follows: graphite crystal has a scale-like shape, and the crystal falls off in a layer shape under mechanical force. By adding a powder of another material having a high hardness which does not destroy the "layer shape", for example, iron oxide and aluminum powder into a graphite dispersion, destruction of graphite crystal form is not caused. Therefore, the durability of the graphite layer is improved.

This effect is observed not only in endless tapes, but also in sheet-shaped magnetic recording mediums.

EXAMPLE 4

A magnetic recording material was produced by forming a dispersion of the following ingredients:

$\gamma$-$Fe_2O_3$ (acicular shape, size: (average) 0.6–0.04 microns) . . . 300 g
Copolymer of Vinyl Chloride and Vinyl Acetate (73:17 molar ratio) . . . 80 g
Tributyl Phosphate (plasticizer) . . . 15 g
Fluorine-containing Oil . . . 2 g
Butyl Acetate (solvent) . . . 700 g 70 grams/m² of the above dispersion were coated onto a polyethylene terephthalate support having a thickness of 25 microns, in an amount such that the resulting magnetic recording layer, after being dried, had a thickness of 10 microns. The resulting magnetic recording medium was then slit into widths of 6.25 millimeters (¼ inch) to provide several samples. This support was used to form Samples 1 to 13 below.

On the support on the side opposite to the magnetic recording layer, coatings formed of the following compositions as shown in Table 1 were applied and dried to provide a layer of a dry thickness of 1μ.

Sample Nos. 1 to 12 were obtained in the above manner.

| | |
|---|---|
| Graphite | 300 g. |
| Nitrocellulose | as shown in Table 1 |
| $Cr_2O_3$ (average particle size of 10μ) | as shown in Table 1 |
| Vinyl Acetate | 10 g. |
| Lecithin | 5 g. |
| Butyl Acetate | 600 g. |

Table 1

| Sample No. | Nitrocellulose (g) | Binder/100g of Graphite | $Cr_2O_3$ (g) |
|---|---|---|---|
| 1 | 30 | 10 | — |
| 2 | 30 | 10 | 15 |
| 3 | 60 | 20 | — |
| 4 | 60 | 20 | 15 |
| 5 | 90 | 30 | — |
| 6 | 90 | 30 | 15 |
| 7 | 120 | 40 | — |
| 8 | 120 | 40 | 15 |
| 9 | 150 | 50 | — |
| 10 | 150 | 50 | 15 |
| 11 | 180 | 60 | — |
| 12 | 180 | 60 | 15 |

Each resulting magnetic recording tape (Sample Nos. 1 to 12) having a back-coating layer was prepared as an endless tapes having a length of 62 m, and included in 8-track cartridge. An audio signal of 3 KHz was recorded on each of the samples.

The coefficient friction (μ) and a wow and flutter level of each sample, using a tape speed of 9.5 cm/sec. and a tension of between the magnetic recording layer and backing layer of 50 g, were measured and the results obtained are shown at Tables 2 and 3.

Table 2

| | (30 sec after running) | |
|---|---|---|
| Sample No. | Coefficient of Friction (μ) | Wow and Flutter (%) |
| 1 | 0.09 | 0.34 |
| 2 | 0.10 | 0.30 |
| 3 | 0.10 | 0.25 |
| 4 | 0.11 | 0.22 |
| 5 | 0.12 | 0.22 |
| 6 | 0.13 | 0.21 |
| 7 | 0.13 | 0.17 |
| 8 | 0.14 | 0.15 |
| 9 | 0.14 | 0.15 |
| 10 | 0.13 | 0.15 |
| 11 | 0.25 | 0.30 |
| 12 | 0.24 | 0.33 |

Table 3

| | (The Period until stopping the Tape.) | |
|---|---|---|
| Sample | Coefficient of Friction (μ) | The period after 0.5% of Wow and Flutter until stopping the Tape (hours) |
| 1 | 0.30 | 300 |
| 2 | 0.28 | 400 |
| 3 | 0.30 | 380 |
| 4 | 0.26 | 500 |
| 5 | 0.26 | 500 |
| 6 | 0.30 | 700 |
| 7 | 0.30 | 800 |
| 8 | 0.30 | 1000 |
| 9 | 0.28 | 800 |
| 10 | 0.30 | 1000 |
| 11 | 0.40 | 380 |
| 12 | 0.40 | 400 |

The above results contained Tables 2 and 3 demonstrate that the magnetic recording tape of the present invention (Samples 4, 6, 8 and 10) is superior. That is to say, these results confirm that the coefficient of friction and the wow and flutter level decrease when the binder is present in an amount of less than 20 parts by weight and more than 50 parts by weight to 100 parts by weight of a graphite and without the finely divided powder.

While the invention has been described in detail and with reference to specific embodiments thereof, it will be apparent to one skilled in the art that various changes and modifications can be made therein without departing from the spirit and scope thereof.

What is claimed is:

1. In an endless magnetic recording tape comprising a support, a magnetizable layer provided on one side of said support and a graphite anti-abrasion layer provided on the opposite side of said support from said magnetizable layer, the improvement comprising said anti-abrasion graphite layer consisting essentially of, dispersed in 20 to 50 parts by weight of a binder, 100 parts by weight of graphite and 5 to 15 parts by weight of a finely divided powder having a particle size of less than 10 microns and Moh's hardness of greater than 2 whereby the anti-abrasion properties of said magnetic recording medium are improved.

2. The endless magnetic recording tape of claim 1 wherein said powder is a member selected from the group consisting of iron oxides, aluminum oxide, chromium oxide, silicon carbide, silicon dioxide, zinc oxide, garnet and tungsten carbide.

3. The endless magnetic recording tape of claim 1 wherein said finely divided powder has a particle size of less than 5 microns.

4. The endless magnetic recording tape of claim 1 wherein said magnetizable layer comprises from 30 to 40% by volume of magnetic powders and from 60 to 70% by volume of a binder.

5. The endless magnetic recording tape of claim 4 wherein said binder of the magnetizable layer is polyvinyl acetate, a copolymer of vinyl chloride and vinyl acetate or an epoxy resin.

6. The endless magnetic recording tape of claim 1 wherein said support is triacetyl cellulose, diacetyl cellulose, polyethylene terephthalate or polyvinyl chloride.

7. The endless magnetic recording tape of claim 1 wherein said graphite layer consists essentially of graphite powder, a binder, a plasticizer, and said finely divided powder of claim 1.

8. The endless magnetic recording tape of claim 7 wherein said binder of said graphite layer is a vinyl chloride-vinyl acetate copolymer, and wherein said plasticizer is tricresylphosphate.

9. The endless magnetic recording tape of claim 1 wherein said graphite anti-abrasion layer consists essentially of, dispersed in a binder, graphite and said finely divided powder having a particle size of less than 5 microns and a Moh's hardness of greater than 2.

10. In an endless magnetic recording tape comprising a support, a magnetizable layer provided on one side of said support and a graphite anti-abrasion layer provided on the opposite side of said support from said magnetizable layer, the improvement comprising said anti-abrasion graphite layer consisting essentially of, dispersed in 15.79 to 19.74 percent by weight of a binder 63.16 to 78.95 percent by weight of graphite and 1.31 to 21.05 percent by weight of a finely divided powder having a particle size of less than 10 microns and Moh's hardness of greater than 2 whereby the anti-abrasion properties of said magnetic recording medium are improved.

11. The endless magnetic recording tape of claim 10 wherein said powder is a member selected from the group consisting of iron oxides, aluminum oxide, chromium oxide, silicon carbide, silicon dioxide, zinc oxide, garnet and tungsten carbide.

12. The endless magnetic recording tape of claim 10 wherein said magnetizable layer comprises from 30 to 40% by volume of magnetic powders and from 60 to 70% by volume of a binder.

13. The endless magnetic recording tape of claim 12 wherein said binder of the magnetizable layer is polyvinyl acetate, a copolymer of vinyl chloride and vinyl acetate or an epoxy resin.

14. The endless magnetic recording tape of claim 10 wherein said support is triacetyl cellulose, diacetyl cellulose, polyethylene terephthalate or polyvinyl chloride.

15. The endless magnetic recording tape of claim 10 wherein said graphite layer consists essentially of graphite powder, a binder, a plasticizer, and said finely divided powder of claim 1.

16. The endless magnetic recording tape of claim 15 wherein said binder of said graphite layer is a vinyl chloride-vinyl acetate copolymer, and wherein said plasticizer is tricresylphosphate.

17. The endless magnetic recording tape of claim 10 wherein said graphite anti-abrasion layer consists essentially of, dispersed in a binder, graphite and said finely divided powder having a particle size of less than 10 microns and a Moh's hardness of greater than 2.

18. The endless magnetic recording tape of claim 1 wherein the finely divided powder having a hardness of more than 2 on the Moh's scale is selected from the group of compounds consisting of iron oxides, chromium oxides, silicon oxide, zinc oxide, titanium boride, boron nitride, titanium nitride, zirconium nitride, artificial diamond, silicon carbide, boron carbide, titanium carbide, zirconium carbide, tungsten carbide, chromium carbide, molybdenum carbide and also such minerals as sylvite, muscovite, cinnabar, pyrolusite, polybasite, brucite, borax, carnallite, cryolite, phlogopite, bournonite, crocoite, calcite, enargite, olivenite, anhydrite, celestite, millerite, chalcopyrite, zincblende, barite, dolomite, heulandite, magnesite, fluorite, pyrrhotite, zincite, smithonite, colemanite, philipsite, wollastonite, scheelite, hemimorphite, apophyllite, thorite, apatite, wolframite, limonite, niccolite, arsenopyrite, willemite, chromite, cobaltite, uraninite, psilomelane, smaltite, anatase, sodalite, orthoclase, magnetite, plagioclase, rutile, pyrite, spodumene, cassiterite, diaspore, olivine, sillimanite, quartz, garnet, agate, beryl, tourmaline, staurolite, andalusite, zircon, spinel, topaz, phenacite, chrysoberyl corundum, carborundum, and diamond.

19. A magnetic recording medium comprising:
a non-magnetic substrate having two faces,
a magnetic layer covering one face of said substrate; and
a wear resistant coating securely adhered to the second face of said substrate, said coating consisting essentially of graphite and particles of $\alpha$-$Fe_2O_3$ dispersed in a binder matrix of polymeric material, said $\alpha$-$Fe_2O_3$ particles constituting about 7.4% by weight of said coating.

20. The magnetic record element of claim 19 wherein the magnetic layer comprises magnetic particles dispersed in a binder matrix.

21. The magnetic record medium of claim 19 wherein the substrate is a polyester.

* * * * *